US005946817A

United States Patent [19]

Sato

[11] Patent Number: 5,946,817

[45] Date of Patent: Sep. 7, 1999

[54] METHOD OF, AND APPARATUS FOR DRYING SHAPED CERAMIC BODIES

[75] Inventor: Ritsu Sato, Iwakura, Japan

[73] Assignee: NGK Insulators, Ltd., Japan

[21] Appl. No.: 09/048,661

[22] Filed: Mar. 26, 1998

[30] Foreign Application Priority Data

Mar. 28, 1997 [JP] Japan .................................... 9-076855
Mar. 12, 1998 [JP] Japan .................................. 10-061473

[51] Int. Cl.[6] ...................................................... F26B 15/00

[52] U.S. Cl. ................................................ 34/267; 34/269

[58] Field of Search ............................ 34/266, 267, 268, 34/269, 443, 444, 476, 535, 60, 68, 90, 191, 195, 196, 197, 225; 219/205, 390, 553, 541, 543, 544; 392/407, 416

[56] References Cited

U.S. PATENT DOCUMENTS

| | | | |
|---|---|---|---|
| 4,439,929 | 4/1984 | Kitagawa et al. | 34/254 |
| 4,665,626 | 5/1987 | Berkamann et al. | 34/267 |
| 4,857,245 | 8/1989 | Oshima et al. | 264/432 |
| 5,319,861 | 6/1994 | Tate | 34/267 |
| 5,472,720 | 12/1995 | Rakhimov et al. | 426/241 |

FOREIGN PATENT DOCUMENTS

| | | |
|---|---|---|
| 56-109865 | 8/1981 | Japan . |
| 2-4386 | 6/1990 | Japan . |
| 4-0270163 | 9/1992 | Japan . |
| 5-087452 | 4/1993 | Japan . |
| 5-87452 | 4/1993 | Japan . |
| 6-48812 | 2/1994 | Japan . |
| 394 013 | 6/1965 | Switzerland . |

OTHER PUBLICATIONS

Wu, Changji, et al., *Drying Method for Ceramic Green Bodies*, vol. 108, No. 14, Apr. 1988, p. 334.

*Primary Examiner*—Henry Bennett
*Assistant Examiner*—Steve Gravini
*Attorney, Agent, or Firm*—Wall Marjama Bilinski & Burr

[57] ABSTRACT

Method and apparatus for quickly drying shaped ceramic bodies (3) having a complex surface (3*a*, 4*a*) with enriched unevenness, and a simple surface (3*b*, 4*b*) which is less uneven as compared to the complex surface (3*a*, 4*a*), without causing drying cracks and within a shortened time. The shaped ceramic body (3) within a drying chamber (1) is primarily heated from the simple surface (3*b*, 4*b*) by a main infrared heater (6), which is arranged on the simple surface side. Preferably, the ceramic body (3) is also heated by an auxiliary infrared heater (7) of a relatively low temperature, which is arranged on the side of the complex surface (3*a*, 4*a*), or dried while admitting a hot air into the drying chamber (1) with a low speed.

12 Claims, 4 Drawing Sheets

1
6
6
6
6
3
3
3
2
7
7
7
7

1
2
3
6
7

1
2
2a
3
4
4a
4b
5
5a
6
7

1
8
6
3
1a 7
3a
3b
6
1a
7

METHOD OF, AND APPARATUS FOR DRYING SHAPED CERAMIC BODIES

BACKGROUND OF THE INVENTION

1. Field of the Invention

The present invention relates to a method of, and an apparatus for drying shaped ceramic bodies having a first surface with an enriched unevenness, and a second surface which is less uneven than said first surface, such as shaped ceramic bodies prepared for manufacturing suspension-type insulators or hollow insulators.

2. Description of Related Art

Heretofore, in order to quickly dry shaped ceramic bodies of a simple configuration, such as a flat plate, there has been typically used an infrared heater. However, such infrared heater is not used for drying shaped ceramic bodies for suspension-type insulators or hollow insulators, having one side which is a complex surface with significant unevenness as compared to its thickness, and an opposite side which is a simple surface with less unevenness as compared to the complex surface. This is because the complex surface of the shaped ceramic body has a large surface area per unit volume and thus receives a higher amount of radiation heat from the infrared heater, whereas the simple surface has a small surface area per unit volume and thus receives a lower amount of radiation heat. This means that the temperature distribution in the shaped ceramic body as a whole becomes non-uniform, and the convex regions in the complex surface are heated to a higher temperature than the concave regions so that so-called "drying cracks" tend to be formed in the convex regions.

In view of the above-mentioned drawbacks, it has been a conventional practice to dry shaped ceramic bodies of complex configuration by means of hot wind re-circulation process, such as environmental drying process, or a natural drying process. However, such a drying process requires substantial drying time, ranging from several tens to several hundreds hours, besides that the drying state becomes unstable due to environmental influences and is not easy to control.

DISCOLSURE OF THE INVENTION

Therefore, it is an object of the present invention to provide method and apparatus which eliminate the drawback of the above-mentioned prior art, and make it possible to quickly dry shaped ceramic bodies having a complex surface with enriched unevenness and a simple surface which is less uneven as compared to the complex surface, without causing drying cracks and within a shortened time.

To this end, according to one aspect of the present invention, there is provided a method of drying a shaped ceramic body having a first surface with an enriched unevenness, and a second surface which is less uneven than said first surface, wherein said shaped ceramic body is mainly heated from said second surface, by a main infrared heater which is arranged on a side of said second surface.

According to another aspect of the present invention, there is provided an apparatus for drying a shaped ceramic body having a first surface with an enriched unevenness, and a second surface which is less uneven than said first surface, said apparatus comprising a main infrared heater which is arranged on a side of said second surface, for heating said shaped ceramic body is mainly from said second surface.

As explained above, a conventional process for drying shaped ceramic bodies by means of an infrared heater has been applied primarily to shaped ceramic bodies of simple configuration, such as flat plates, wherein radiation heat is uniformly applied to the ceramic body from both sides thereof. In contrast, the object to be dried according to the present invention is a shaped ceramic body having a complex first surface with an enriched unevenness, and simple second surface which is less uneven that the first surface. The present invention is based on a practically obtained recognition that, even when an infrared heater is applied to the drying process with respect to such object, the drying process can be suitably performed without causing drying cracks and within a shortened time, when the shaped ceramic body is mainly heated from the second surface, by a main infrared heater which is arranged on a side of the second surface.

Advantageously, the shaped ceramic body is also heated from the first surface, by an auxiliary infrared heater which is arranged on a side of the first surface. By this, when the shaped ceramic body is heated primarily from the less uneven second surface of a simple configuration, by the main infrared heater arranged on the side of the second surface, the convex regions in the second surface, to which heat would be hardly transmitted by such a primary heating alone, are subjected to supplementary heating by the auxiliary infrared heater of a relatively low temperature. As a result, the temperature distribution of the shaped ceramic body as a whole is made uniform, and it becomes possible to more positively prevent formation of drying cracks, particularly at the convex regions in the second surface.

In this instance, the shaped ceramic body is preferably dried by intermittently operating at least one of the main infrared heater and the auxiliary infrared heater. More preferably, the main infrared heater and the auxiliary infrared heater are simultaneously operated in intermittent manner.

Advantageously, the shaped ceramic body is dried by maintaining said main infrared heater at a temperature of 180–600° C. For example, the temperature of the main infrared heater is preferably set to be 180–350° C. when the shaped ceramic body is for a suspension insulator, and to be 300–600° C. when the shaped ceramic body is for a hollow insulator. Further, when the auxiliary infrared heater is used in addition to the main infrared heater, the temperature difference between these infrared heaters is preferably set to be not less than 30° C.

The shaped ceramic body is preferably dried within a closed drying chamber. In this instance, there may be provided means for admitting a hot air into the drying chamber in which the shaped ceramic body and at least the main infrared heater are accommodated, so that the shaped ceramic body is dried while admitting a hot air into the drying chamber. Preferably, the speed of the hot air is set to be 0.1–0.5 m/s, and the temperature of the hot air is set to be within a range from the temperature of the shaped ceramic body to 150° C.

BRIEF DESCRIPTION OF THE DRAWINGS

The present invention will be explained in further detail below, with reference to certain preferred embodiments shown in the accompanying drawings, in which.

DETAILED DESCRIPTION OF THE PREFERRED EMBODIMENTS

Figure 1:
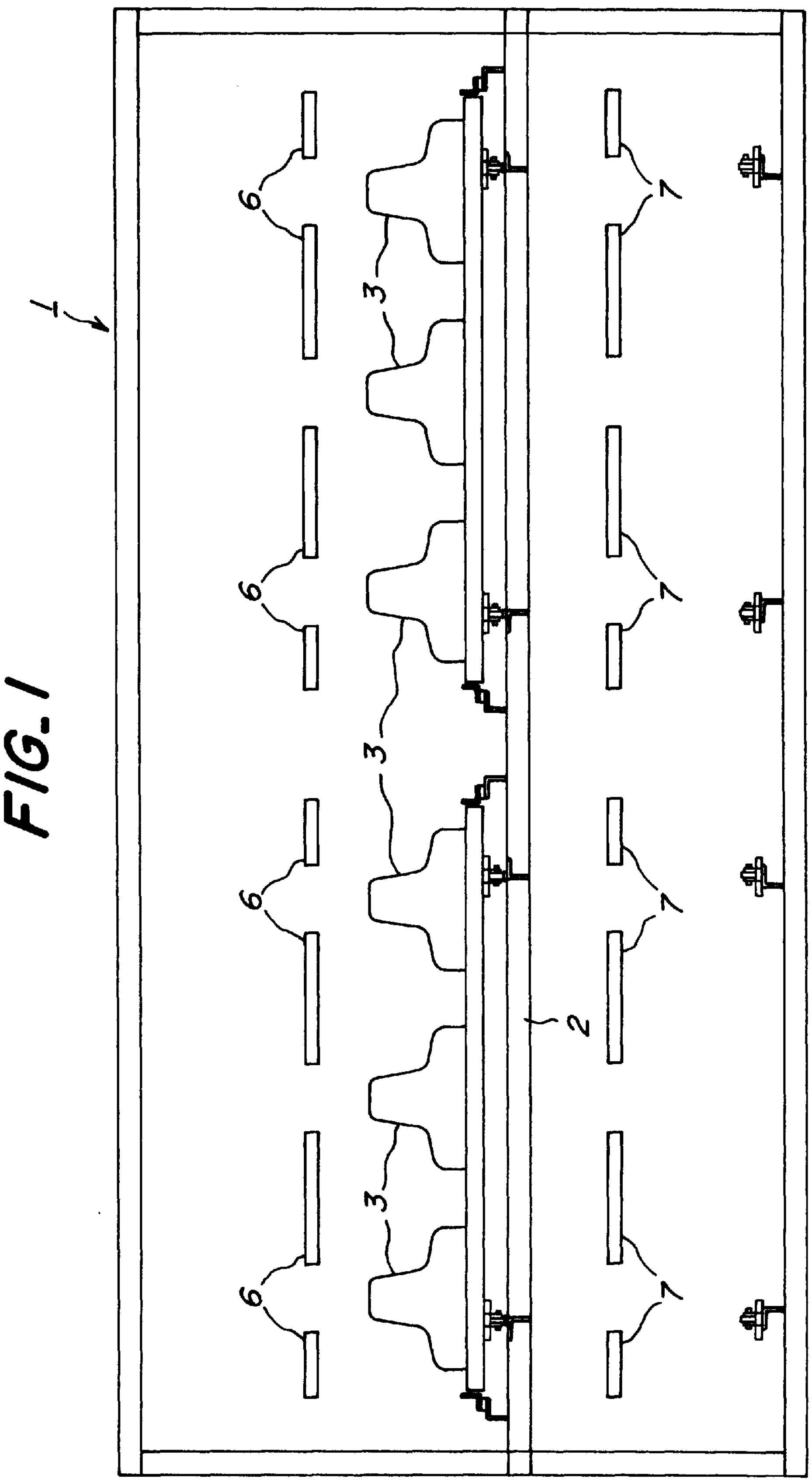
FIG. 1 is a schematic sectional view showing one embodiment of the apparatus for carrying out the drying method according to the present invention.
Figure 2:
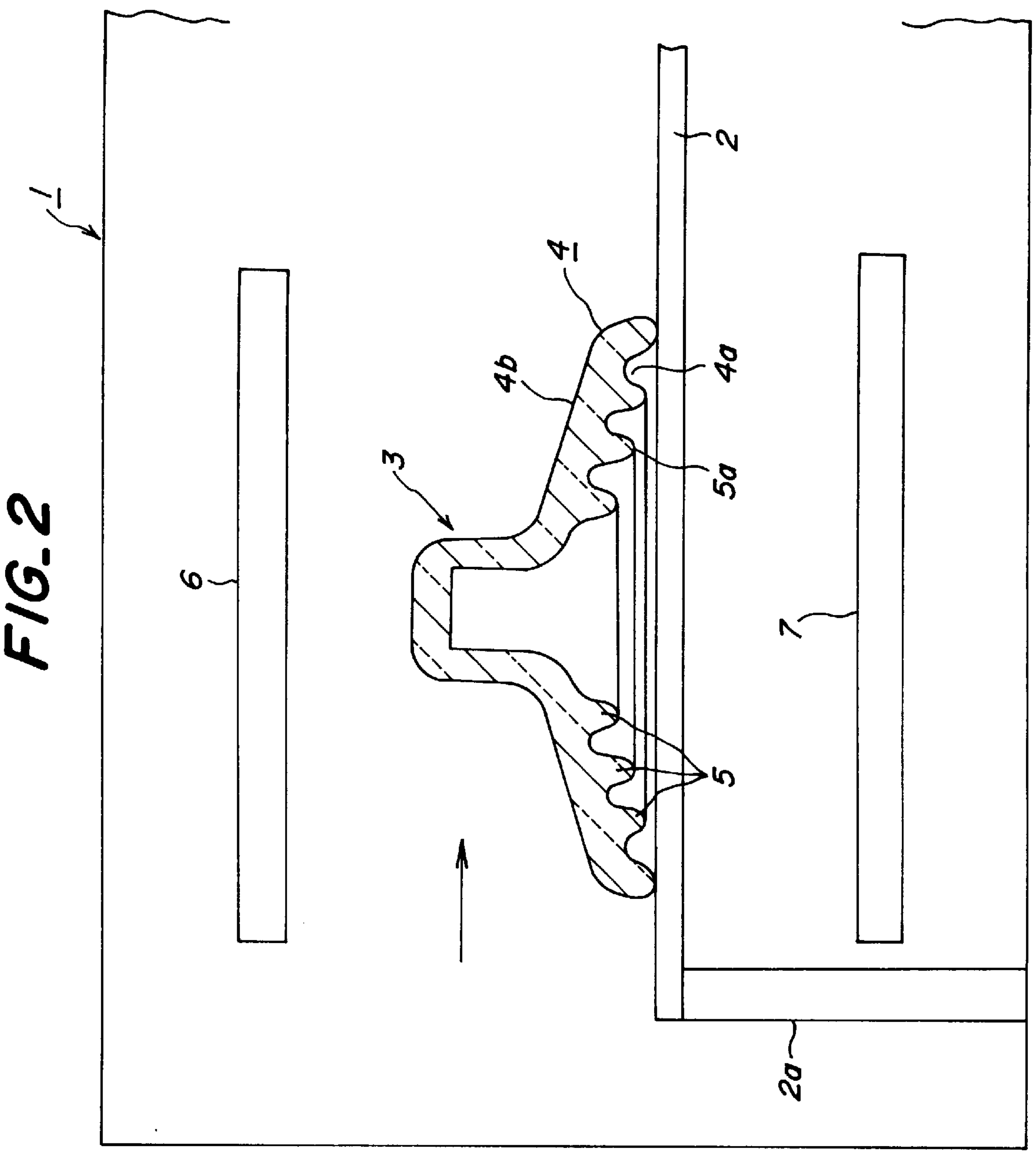
FIG. 2 is an enlarged view showing the detail of the apparatus of FIG. 1.

There is shown, in FIGS. 1 and 2, a first embodiment of the drying apparatus suitable for carrying out the present invention. The apparatus comprises a drying chamber 1 which can be closed from outside, and a supporting stand 2 having a substantially horizontal supporting surface is arranged within the drying chamber 1. The supporting stand 2 is for mounting thereon shaped ceramic bodies 3 as objects to be dried. The supporting stand 2 is provided with legs 2*a*, as shown in FIG. 2, and formed as a stationary or movable structural body. When the drying chamber 1 is of a tunnel-type, for example, the supporting stand 2 may be replaced by an endless transfer belt which circulates within the drying chamber.

The shaped ceramic body 3 in this embodiment is a semi-finished product for manufacturing a suspension insulator having a shed portion 4. As shown in FIG. 2, the shed portion 4 has a lower surface which is formed with a plurality of concentrically arranged annular ridges 5, and which is thus formed as a complex surface 4*a* having a relatively large unevenness as compared to its thickness. On the other hand, in contrast to the lower surface, the upper surface of the shedportion 4 is formed as a relatively flat simple surface 4*b*.

In the drying chamber 1, main infrared heaters 6 of a relatively high temperature are arranged above the supporting stand 2, while auxiliary infrared heaters 7 of a relatively low temperature are arranged below the supporting stand 2. These infrared heaters 6, 7 may comprise far-infrared heater panels, of which the wavelength is suitable for drying moisture content.

The shaped ceramic body 3 is mounted on the supporting stand 2 such that the complex surface 4*a* is directed downwards. Such mounting not only serves to stabilize the posture of the shaped ceramic body 3, but also make it possible to achieve balanced drying speeds from both upper and lower surface sides. This is because the complex surface 4*a*, which has a large surface area per unit volume and would thus be liable to undergo a prompted drying, is situated on the back side as seen from the main infrared heater 8 and thereby oriented as a lower surface which undergoes a slow drying. Incidentally, the supporting stand 2 preferably has a structure which does not shield the lower surface of the shaped ceramic body 3. Thus, as shown in FIG. 2, the supporting stand 2 may be formed to have a grid- or mesh-like structure.

The main infrared heater 2 arranged above the supporting stand 2 serves to heat the shaped ceramic body 3 mounted on the supporting stand 2, from the side of its simple surface 4*b*. Thus, the shaped ceramic body 3 receives the radiation heat from the main infrared heater 6 and thereby heated from its simple surface 4*b*. The radiation heat applied to the simple surface 4*b* of the shaped ceramic article 3 is transferred toward interior of the shaped ceramic body 3 by thermal conduction. As a result, the interior of the shaped ceramic body 3 is gradually heated from the side of the simple surface 4*b* to promote drying.

According to the present invention, since the shaped ceramic body 3 is dried mainly from the side of the simple surface 4*b*, the tip projections 5*a* of the annular ridges 5 on the complex surface 4*a* are can be prevented from being locally overheated as compared to remaining regions. It is thus possible effectively to prevent formation of drying cracks. Moreover, the present invention makes it possible to complete drying within a markedly shortened time of approximately 8 hours, in contrast to drying according to the conventional hot wind re-circulation process or natural drying process which require approximately 24–48 hours for drying.

Depending upon the geometrical shape of the complex surface 4*a* of the shaped ceramic body 3, there may be instances wherein the cross-sectional area at the tip projections 5*a* of the annular ridges 5 is so small that heat conductance is insufficient. Then, a quick heating could be hardly achieved by the radiation heat from the main infrared heater 6 alone. In such instances, it is highly advantageous to promote drying at the tip projections 5*a* by a modest auxiliary heating from the side of the complex surface 4*a*, using an auxiliary infrared heater 7 of a relatively low temperature.

It is of course that the heating temperatures of the above-mentioned main infrared heater 6 and auxiliary infrared heater 7 are appropriately determined depending upon parameters of the shaped ceramic body, such as shape, moisture content and the like. For example, when drying is to be performed with respect to a shaped ceramic body for a suspension-type insulator, having moisture content of approximately 20%, the heating temperature of the main infrared heater is preferably set to 180–350° C. Furthermore, when an auxiliary heating by the auxiliary infrared heater is also performed, the heating temperature of the auxiliary radiation heater 7 is set to be at least 30° C. lower than the heating temperature of the main infrared heater 6.

The infrared heaters 6, 7 may be intermittently operated, if necessary, with an operating cycle of repetition of an operating period T1 of approximately 10–20 minutes and a non-operating period T2 of approximately 5–20 minutes. By such intermittent operation, during the period in which the infrared heaters 6, 7 are stopped, a heat transfer is caused inside the shaped. ceramic body 3 from the high temperature side to the low temperature side so as to prevent an unbalanced drying which would otherwise take place due to an unbalanced heating. As a result, it is possible to set the heating temperature of infrared heaters to a relatively high level as compared to a drying by continuous heating, to further shorten the required drying time. When both of the infrared heaters 6, 7 are intermittently operated, from the view point of preventing unbalanced drying, it is more effective to simultaneously operate the heaters in intermittent manner.

In order to verify the advantageous effects of the present invention, drying experiments were performed with respect to shaped ceramic bodies, by changing the heating temperatures of the main infrared heater 6 and the auxiliary infrared heater 7, as well as the operating conditions. The results of these experiments are shown in Table 1 below. In this instance, the shaped ceramic bodies were for silica-alumina-clay-based suspension-type insulators with moisture content of approximately 19%. As infrared heaters, there were used electric far-infrared heaters with an output of approximately 30 kW. Furthermore, in the intermittent operation mode, the main infrared heater and the auxiliary infrared heater were operated and stopped, both simultaneously.

TABLE 1

| | Temperature of Main Heater (° C.) | Temperature of Auxiliary Heater (° C.) | Intermittent Operation Cycle (T1min/ T2min) | Drying Time (hr) | Drying State (Yield %) |
|---|---|---|---|---|---|
| Example 1 | 180 | 100 | Continuous Operation | 7.5 | 100 |
| Example 2 | 200 | 150 | Continuous Operation | 6.5 | 100 |
| Example 3 | 200 | 170 | Continuous Operation | 6 | 100 |
| Example 4 | 220 | 150 | Continuous Operation | 5.5 | 100 |
| Example 5 | 240 | 150 | Continuous Operation | 5 | 100 |
| Example 6 | 260 | 150 | Continuous Operation | 4.5 | 100 |
| Example 7 | 260 | 150 | 10/10 | 4.4 | 100 |
| Example 8 | 260 | 150 | 15/15 | 4.6 | 100 |
| Example 9 | 260 | 150 | 20/20 | 4.8 | 90 |
| Example 10 | 260 | 150 | 10/5 | 4.4 | 90 |
| Example 11 | 280 | 180 | Continuous Operation | 4.2 | 80 |
| Example 12 | 280 | 180 | 10/10 | 4 | 100 |
| Example 13 | 300 | 200 | 10/10 | 3.5 | 80 |
| Example 14 | 350 | 250 | 10/10 | 3 | 70 |
| Comparative Example 1 | Hot Wind Drying 120 | | | 12 | 20 |
| Comparative Example 2 | 150 | 150 | Continuous Operation | 8 | 40 |
| Comparative Example 3 | 260 | 250 | Continuous Operation | 4 | 30 |
| Comparative Example 4 | 260 | 260 | 10/10 | 4 | 30 |
| Comparative Example 5 | 300 | 280 | Continuous Operation | 3.5 | 20 |
| Comparative Example 6 | 370 | 250 | 10/10 | 3 | 40 |

As can be appreciated from Table 1 that, in the case of Examples 1–14 according to the present invention, wherein the heating temperatures of the main infrared heater and the auxiliary infrared heater were appropriately determined, it was possible to complete drying of the shaped ceramic bodies within a relatively short time and with a relatively high yield. In contrast, the Comparative Example 1 is in accordance with conventional hot wind drying process and shows that the drying requires a long time, besides that the yield is extremely low. Also, even by using the auxiliary infrared heater, a high yield could not be achieved even though the drying time could be shortened, when the temperature difference to the main infrared heater was not appropriately determined, as in the Comparative Examples 2–5, or when the heating temperature of the main infrared heater was set to somewhat higher level, as in the Comparative Example 6.

During the period in which shaped ceramic body 3 is dried in accordance with the present invention, it is advantageous to continuously supply hot air into the drying chamber 1 so that vapor generated from the shaped ceramic body 3 is discharged out of the drying chamber to promote drying. When the shaped ceramic body to be dried is for a suspension-type insulator, it is difficult to effectively discharge vapor out of the drying chamber under the speed of hot air which is below 0.1 m/s, while cracks tend to be formed due to the wind under the speed which exceeds 0.5 m/s. Therefore, it is preferred that the speed of the hot air is set to a value within a range of 0.1–0.5 m/s.

The temperature of the hot air is preferably set to a level within a range from the temperature of the shaped ceramic body to 130° C. When the temperature of the shaped ceramic body 3 is 60–90° C., it is preferred that the temperature of the hot air is approximately 100–130° C. An excessively high temperature of the hot air may also cause formation of drying cracks.

In order to verify advantageous effect of the present invention wherein a hot air is admitted into the drying chamber upon drying a shaped ceramic body, drying experiments were performed with respect to shaped ceramic bodies 3, by continuously operating the infrared heaters 6, 7 with their heating temperatures maintained constant, and changing the speed and temperature of the hot air. The results of these experiments are shown in Table 2 below. In this instance, the shaped ceramic bodies 3 were for silica-alumina-clay-based suspension-type insulators with moisture content of approximately 19%. As infrared heaters 6, 7, there were used electric far-infrared heaters with an output of approximately 30 kW, with the temperatures of the main infrared heater 6 and the auxiliary infrared heater 7 set to 260° C. and 150° C., respectively.

TABLE 2

| | Speed of Hot Air (m/s) | Temperature of Hot Air (° C.) | Drying Time (hr) | Drying State (Yield %) |
|---|---|---|---|---|
| Example 1 | 0.1 | 110 | 5 | 100 |
| Example 2 | 0.3 | 60 | 5 | 100 |
| Example 3 | 0.3 | 110 | 4.5 | 100 |
| Example 4 | 0.5 | 60 | 5 | 90 |
| Example 5 | 0.5 | 90 | 4.7 | 100 |
| Example 6 | 0.5 | 110 | 4.5 | 100 |
| Example 7 | 0.5 | 130 | 4.5 | 100 |
| Comparative Example 1 | 0 | — | 9 | 60 |
| Comparative Example 2 | 0.5 | 40 | 5.5 | 40 |
| Comparative Example 3 | 0.8 | 110 | 4.5 | 40 |
| Comparative Example 4 | 1.0 | 110 | 4.5 | 20 |

It can be appreciated from Table 2 that when hot air is admitted into the drying chamber upon drying a shaped ceramic body, it is possible to shorten the drying time while maintaining a high yield according to Examples 1–7 in which the speed and temperature of the hot air are appropriately determined. In particular, as apparent from the Examples 2 and 3 and Examples 4–7, with a constant speed of hot air, the drying time can be shortened by increasing the temperature of the hot air. In contrast, Comparative Example 1 was performed without admitting hot air into the drying chamber, and it is apparent that drying requires a long time since drying could not be promoted by quickly discharging vapor from the shaped ceramic body out of the drying chamber. It is also apparent that when the temperature of hot air is too low as in Comparative Example 2, or when the speed of hot air is too high as in Comparative Examples 3 and 4, a high yield could not be achieved even though the drying time could be shortened.

As explained above in detail, the present invention makes it possible to quickly dry shaped ceramic bodies 3 having a complex surface 4*a* with enriched unevenness and a simple surface 4*b* which is less uneven as compared to the complex surface 4*a*, without causing drying cracks and within a shortened time. It is of course that the present invention is applicable not only to shaped ceramic bodies for suspension-type insulators, but also generally to other shaped ceramic bodies.

Figure 3:
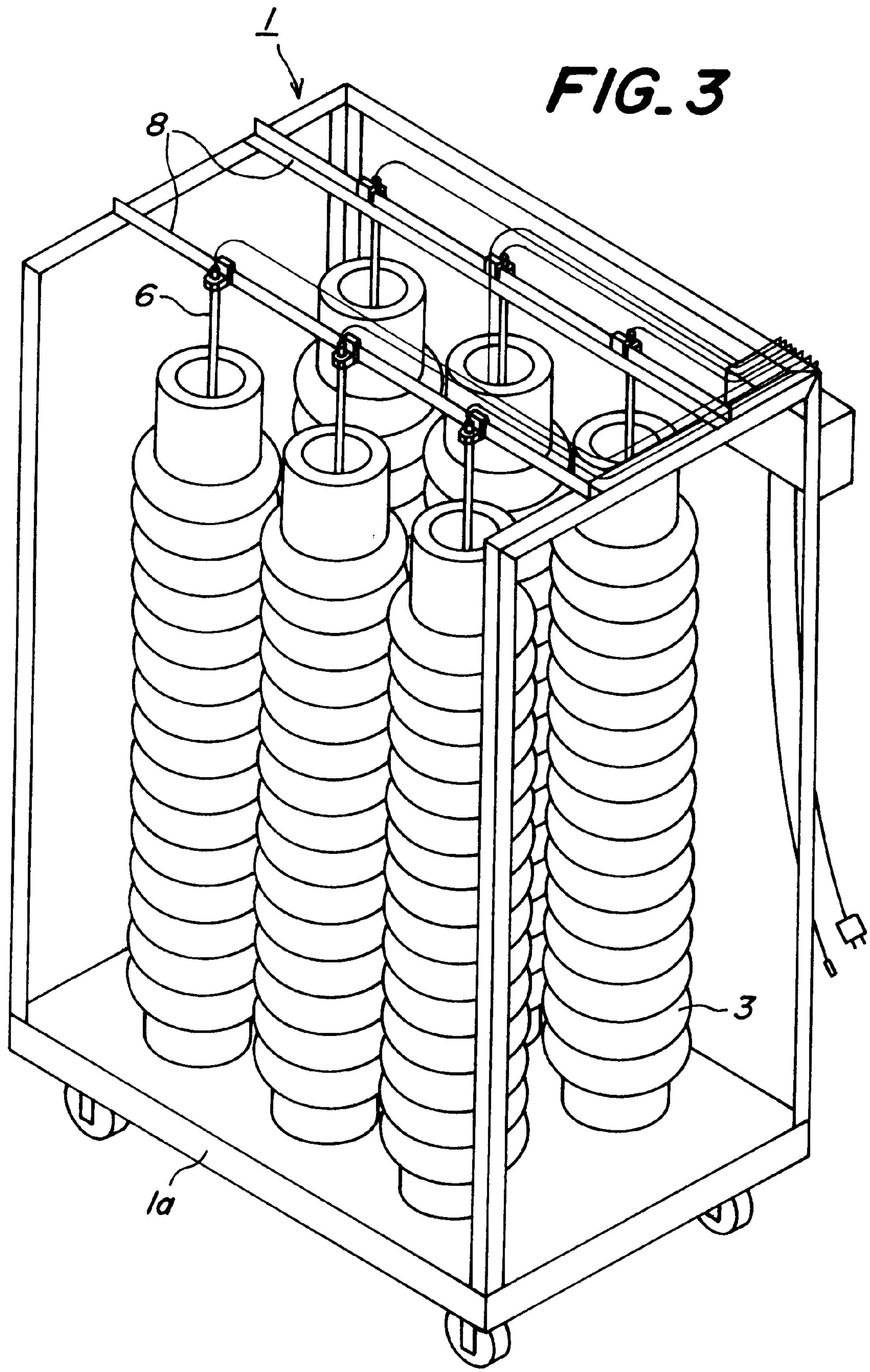
FIG. 3 is a schematic perspective view showing another embodiment of the apparatus for carrying out the drying method according to the present invention.
Figure 4:
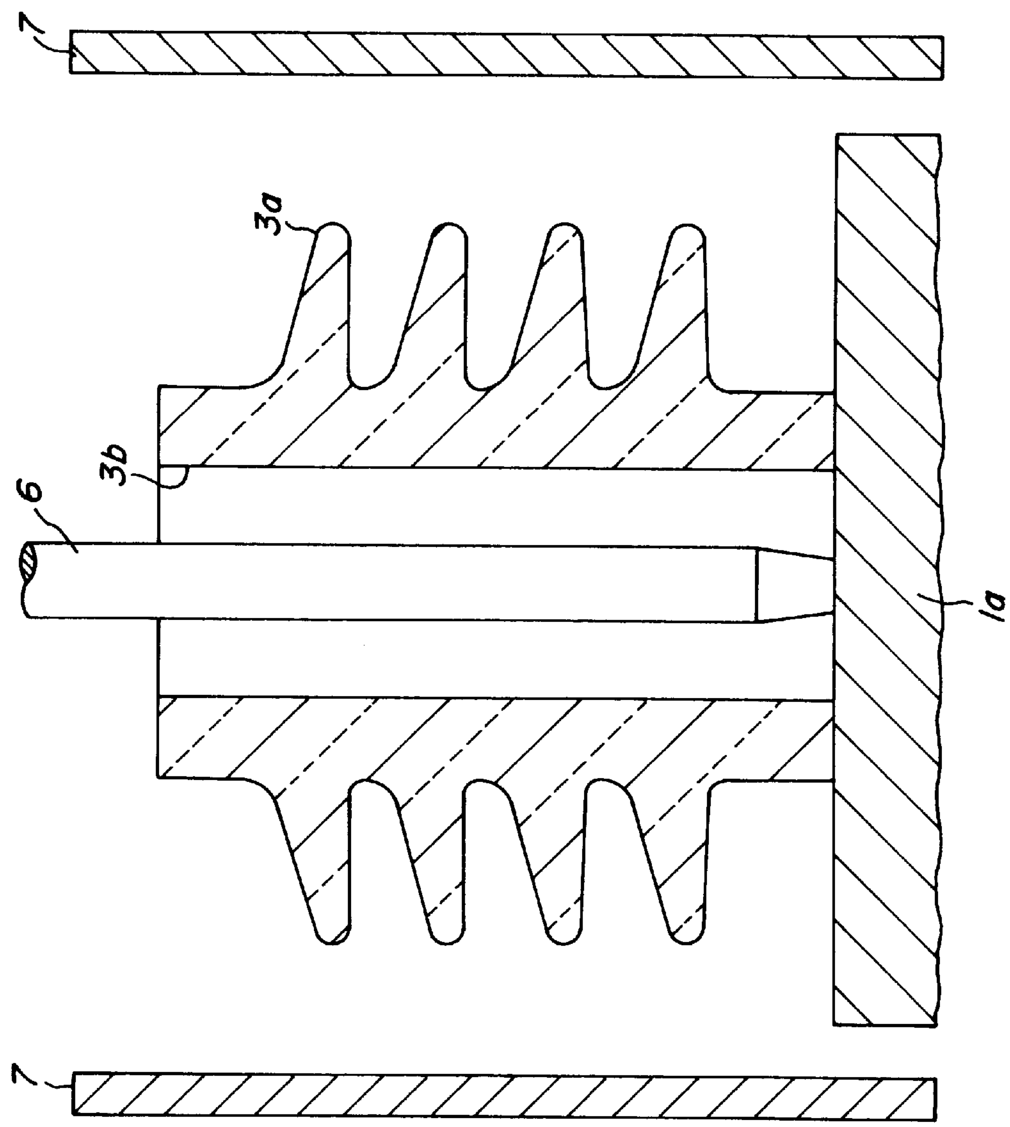
FIG. 4 is an enlarged view showing the detail of the apparatus of FIG. 3.

Another embodiment of the present invention is shown in FIGS. 3 and 4, which is applied drying of a shaped ceramic body for a hollow insulator having an outer surface formed of a number of flange-like unevenness. The drying apparatus according to this embodiment comprises a drying chamber 1 having a bottom wall 1*a* which serves to supper a plurality of shaped ceramic bodies in their upright positions. The drying chamber 1 may form a movable structure having casters. The shaped ceramic body 3 has a center hole 6 having an inner surface which is a simple surface 3*b* substantially without unevenness.

As shown in FIG. 3, horizontal supporting beams 8 are arranged in the upper part of the drying chamber 1, and rod-like main infrared heaters 6 are suspended from the supporting beams 8 and inserted into the center holes of the shaped ceramic bodies 3. There may be arranged within the drying chamber 1 auxiliary infrared heaters 7, which may be plate-like heaters opposing the complex surfaces 3*a* of the shaped ceramic bodies 3. Preferably, the heating temperature of the main infrared heaters 6 is set to a value within a range of 300–600° C., and the heating temperature of the auxiliary infrared heaters 7 is set to a value within a range of 100–200° C. Incidentally, it is preferred that a clearance is formed between the bottom surface 1*a* of the drying chamber 1 and the bottom portion of the shaped ceramic body 3, for allowing a natural ventilation within the interior of the shaped ceramic body 3.

In order to verify advantageous effects of the present invention wherein the shaped ceramic body 3 for a tubular insulator is dried by heating with a main infrared heater 8 mainly form the side of its simple surface 3*b*, drying experiments were performed by operating the infrared heaters 6, 7 under different temperature conditions, with and without natural ventilation. The results of these experiments are shown in Table 3 below. In this instance, the shaped ceramic body 3 for a hollow insulator was 2,000 mm in height, 400 mm in outer diameter and 200 mm in inner diameter, and the moisture content was approximately 17%. When natural ventilation was effected, the dimension of the clearance was determined so that the speed of air flow is within a range of 0.5–1.0 m/s.

TABLE 3

| | Temperature of Main Heater (° C.) | Temperature of Auxiliary Heater (° C.) | Internal Ventilation | Drying Time (hr) | Formation of Drying Cracks |
|---|---|---|---|---|---|
| Example 1 | 300 | No | No | 19 | 0/3 |
| Example 2 | 300 | 100 | Yes | 17 | 0/3 |
| Example 3 | 300 | 200 | Yes | 16 | 0/3 |
| Example 4 | 450 | No | No | 17 | 0/3 |
| Example 5 | 450 | No | Yes | 15 | 0/3 |
| Example 6 | 450 | 100 | No | 15 | 0/3 |
| Example 7 | 450 | 100 | Yes | 13 | 0/3 |
| Example 8 | 450 | 200 | No | 14 | 0/3 |
| Example 9 | 450 | 200 | Yes | 12 | 0/3 |
| Example 10 | 600 | No | No | 10 | 0/3 |
| Example 11 | 600 | No | Yes | 9 | 0/3 |
| Example 12 | 600 | 100 | Yes | 8 | 0/3 |
| Example 13 | 600 | 200 | Yes | 8 | 0/3 |
| Comparative Example 1 | 200 | No | No | 30 | 2/3 |
| Comparative Example 2 | 200 | 100 | Yes | 28 | 1/3 |
| Comparative Example 3 | 450 | 450 | Yes | 11 | 3/3 |
| Comparative Example 4 | 600 | 600 | Yes | 7 | 3/3 |
| Comparative Example 5 | 650 | 200 | Yes | 7 | 3/3 |

It can be appreciated from Table 3 that, in the case of Examples 1–13 according to the present invention, there can be recognized a tendency that increase in the heating temperature of the auxiliary heater results in shortening of the drying time while effectively preventing formation of drying cracks. In particular, Examples 4–11 clearly reveal a tendency that even under the same temperature condition, an internal ventilation serves to shorten the drying time. On the other hand, it is apparent that formation of drying cracks cannot be effectively prevented when the auxiliary heating temperature is not appropriately set as in Comparative Examples 1–4, or when the main heating temperature is excessively high as in Comparative Example 5.

It will be appreciated from the foregoing description that, according to the present invention, it is possible to quickly dry shaped ceramic bodies having a complex surface with enriched unevenness and a simple surface which is less uneven as compared to the complex surface, without causing drying cracks and within a shortened time.

While the present invention has been explained above with reference to certain preferred embodiments, they were presented by way of examples only, and various modifications and/or alterations may be made without departing from the scope of the invention as defined by the appended claims.

What is claimed is:

1. A method of drying a shaped ceramic body having a first surface with an enriched unevenness, and a second surface which is less uneven than said first surface, wherein said shaped ceramic body is mainly heated from said second surface, by a main infrared heater which is arranged on a side of said second surface.

2. The drying method according to claim 1, wherein said shaped ceramic body is heated from said first surface, by an auxiliary infrared heater which is arranged on a side of said first surface.

3. The drying method according to claim 2, wherein said shaped ceramic body is dried by intermittently operating at least one of said main infrared heater and said auxiliary infrared heater.

4. The drying method according to claim 3, wherein said main infrared heater and said auxiliary infrared heater are simultaneously operated in intermittent manner.

5. The drying method according to claim 1, wherein said shaped ceramic body is dried by maintaining said main infrared heater at a temperature of 180–600° C.

6. The drying method according to claim 5, wherein said shaped ceramic body is dried by maintaining a temperature difference between said main infrared heater and said auxiliary infrared heater, to be not less than 30° C.

7. The drying method according to claim 1, wherein said shaped ceramic body is dried by admitting a hot air into a drying chamber in which at least said shaped ceramic body and said main infrared heater are accommodated.

8. The drying method according to claim 7, wherein said shaped ceramic body is dried by maintaining a speed of said hot air to be 0.1–0.5 m/s.

9. The drying method according to claim 7, wherein said shaped ceramic body is dried by maintaining a temperature of said hot air to be within a range from a temperature of said shaped ceramic body to 150° C.

10. An apparatus for drying a shaped ceramic body having a first surface with an enriched unevenness, and a second surface which is less uneven that said first surface, said apparatus comprising a main infrared heater which is arranged on a side of said second surface, for heating said shaped ceramic body is mainly from said second surface.

11. The drying apparatus according to claim 10, further comprising an auxiliary infrared heater which is arranged on a side of said first surface, for heating said shaped ceramic body from said first surface.

12. The drying apparatus according to claim 10, further comprising a drying chamber for accommodating said main infrared heater, and means for admitting a hot air into said drying chamber.

* * * * *